April 1, 1958 E. L. REED 2,828,981
JOINT BETWEEN CARBONACEOUS MEMBERS USING
MOLYBDENUM DISILICIDE BOND
Filed Aug. 19, 1953
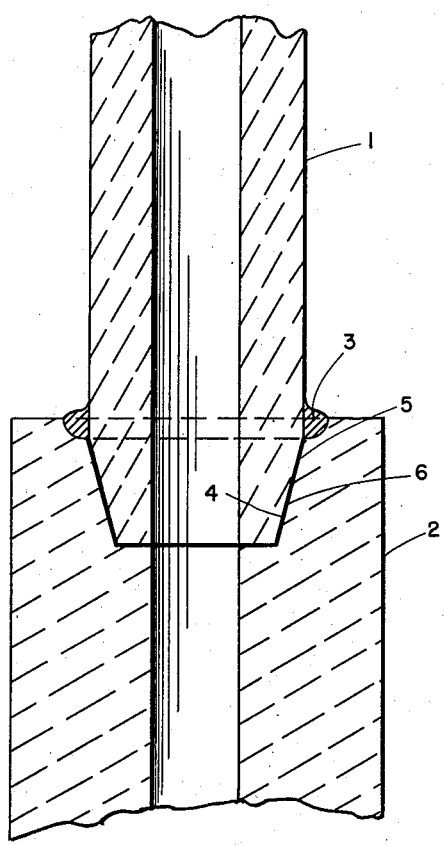
INVENTOR.
EDWARD L. REED
BY
*William L. Lane*
ATTORNEY

United States Patent Office 2,828,981
Patented Apr. 1, 1958

2,828,981

JOINT BETWEEN CARBONACEOUS MEMBERS USING MOLYBDENUM DISILICIDE BOND

Edward L. Reed, Bellflower, Calif., assignor, by mesne assignments, to the United States of America as represented by the United States Atomic Energy Commission Application August 19, 1953, Serial No. 375,213

7 Claims. (Cl. 285—286)

This invention relates to carbon-to-carbon joints and more particularly to an improved joint between two or more carbonaceous pieces which are to be subjected to high temperatures.

When working with liquid metals it is necessary to use tubing, valves, pumps and other component parts of the fluid circuit made of materials which are resistant to corrosive attack by the metals, and which remain structurally strong when operated at high temperatures. Ceramic refractories and carbon, particularly graphite, are among the few materials which have these desired properties. Ideally, the entire fluid circuit is constructed in a single block of the corrosion-resistant material, thereby eliminating the necessity of joining two individual pieces with a leakproof corrosion-resistant seal. However, since this construction is usually impractical, it is necessary to join two or more individually manufactured pieces in a corrosion-resistant, leakproof joint. A circuit for conveying liquid metals operates at temperatures as high as 1500° C. Therefore, a further requirements of the joint is that it must have good bonding strength at these high temperatures. In the past when two pieces of tubing were to be joined together to conduct high temperature liquid metals, the best joint obtainable was made by press-fitting one tube inside the other. This is not a satisfactory method since many of the liquid metals, particularly sodium and bismuth, have great penetrating power and tend to leak out through the very small cracks at the joint.

It is therefore an object of this invention to provide a process for making an improved joint between two carbonaceous members.

It is another object of this invention to provide a method of joining in a high temperature, leakproof, corrosion-resistant arrangement two carbonaceous elements of a liquid metal circuit.

It is a further object of this invention to provide a method of joining two carbonaceous members utilizing fused molybdenum disilicide as the brazing agent.

It is a further object of this invention to provide a method of joining two carbonaceous members utilizing molybdenum disilicide heated to at least 1900° C. as the brazing agent.

It is another object of this invention to provide a method of joining two graphite tubes in a leakproof, corrosion-resistant joint comprising placing molybdenum disilicide at the point to be joined and heating the joint in a neutral atmosphere above the fusion point of molybdenum disilicide.

It is a further object of this invention to provide a leakproof, corrosion-resistant, high temperature joint between two or more carbonaceous members with fused molybdenum disilicide at the point of joining.

Other objects of invention will become apparent from the following description taken in connection with the accompanying drawing which is a sectioned view of a preferred embodiment of the joint contemplated by this invention.

The single view in the drawing shows a longitudinal cross section of a joint between two graphite tubes.

Metallic molybdenum is very resistant to corrosion by most liquid metals. It has a melting point of approximately 2620° C. However, when pure metallic molybdenum is employed as the brazing agent for bonding two carbonaceous members, undesired molybdenum carbides are formed. These carbides are weak links in the joint and cause structural failure of the bond when the joint is loaded at 1500° C. Therefore, a joint made with pure molybdenum is not satisfactory for conducting liquid metals at elevated temperatures. It has been discovered, however, that molybdenum disilicide, when used as the brazing agent between two carbonaceous members, does not materialy combine with the carbon to form molybdenum carbides. Further, good wetting of the carbonaceous material by the molybdenum disilicide occurs at the joint. When operated under load at high temperatures, e. g., 1500° C., the bond between the carbon and the molybdenum disilicide remains strong.

Referring to the single drawing, the preferred joint between two graphite tubes is accomplished as follows: Tubes 1 and 2 are preferably constructed with slight matching tapered surfaces 4 and 5, respectively. After hand-pressing the tubes together, powdered molybdenum disilicide is placed in annular cavity 3 around the outside of the joint. The joint is placed in a neutral or reducing atmosphere and heated by a conventional induction heater to above the fusion point of the molybdenum disilicide powder. Satisfactory joints have been made after heating the molybdenum disilicide to 1900° C. or more. The optimum temperature for this process is approximately 2050° C. After heating for five minutes to insure complete fusion of the molybdenum disilicide, the joint is removed from the heater and cooled. After inspection, it is ready to conduct liquid metals, such as bismuth or sodium, at temperatures as high as 1500° C. without leaking and without material corrosion at the joint. A joint made by this method remains strong when heated to 1500° C. and loaded.

In a joint contemplated by this invention, fused molybdenum disilicide 6 penetrates between tapered surfaces 4 and 5 and is strongly bonded to the graphite surfaces. Thus the effective radial cross-section area of the fused molybdenum disilicide which resists axial tensile forces is substantially equal to the radial cross-section area of the tubes. When the joint is subjected to excessive axial tensile forces, it has been found that the graphite tubes fail before the joint does.

It is contemplated by this invention that a molybdenum disilicide rod, tube or button may be substituted for the powdered form recited in the example. It is also contemplated by this invention that numerous other means of raising the temperature of the joint to above 1900° C. may be substituted for the induction heating recited. These other heat generating means include the well known heliarc, carbon arc, and atomic hydrogen torch processes. It is further contemplated by this invention that complementary surfaces of any convenient make may be substituted for the matched taper described in the preferred embodiment.

The utility of the method and joint described above for joining two carbonaceous bodies is not limited to a joint between tubes in fluid conveyance systems. The process and joint are useful wherever a joint between two carbonaceous bodies is to be subjected to high temperatures. Thus when a graphite shaft, which is to be subjected to high temperatures, is more easily manufactured in two or more sections, this invention contemplates joining the sections by fusing a button of molybdenum disilicide at the joint.

Although the invention has been described and illus-

I claim:

1. A method of joining two or more carbonaceous elements comprising placing molybdenum disilicide at the point of joining, and heating the joint in a non-oxidizing atmosphere to at least 1900° C. whereby a strong, high temperature joint is produced.

2. The process for producing a strong, corrosion resistant, high temperature joint between two carbonaceous members which consists of pressing the two carbonaceous members together, and brazing the joint with fused molybdenum disilicide in a non-oxidizing atmosphere to at least 1900° C. whereby the molybdenum disilicide wets both carbonaceous members.

3. The process for producing a strong, high temperature joint between two carbonaceous members having complementary surfaces comprising placing molybdenum disilicide in the joint, pressing the complementary surfaces of the two members together and heating the joint in a non-oxidizing atmosphere to at least 1900° C. whereby the molybdenum disilicide fuses and adheres to the complementary surfaces of both of said carbonaceous members when said joint is subjected to temperatures up to 1500° C.

4. A method of joining two graphite tubes together in a leakproof, corrosion-resistant joint comprising placing molybdenum disilicite at the joint, pressing said tubes together, and heating the joint in a non-oxidizing atmosphere to at least 1900° C. until substantially all of the molybdenum disilicide has fused whereby upon cooling a strong molybdenum disilicide joint between said two graphite pieces is formed which maintains good bonding strength at high temperatures.

5. A method of joining two carbonaceous members together comprising tapering said members in a matching taper, hand-pressing said members together, placing a molybdenum disilicide brazer at the joint, and heating said joint in a non-oxidizing atmosphere to at least 1900° C. until substantially all of said molybdenum disilicide has fused into said joint whereby upon cooling a strong bond between said carbonaceous members is formed.

6. A corrosion-resistant high temperature joint comprising a first carbonaceous member, a second carbonaceous member, said members having complementary surfaces, and a bond of fused molybdenum disilicide between said surfaces, whereby a carbon-to-carbon joint having good tensile strength at temperatures as high as 1500° C. is formed.

7. A corrosion-resistant high temperature joint useful in liquid metal conveyance systems comprising a first graphite tube, a second graphite tube, said first graphite tube having an inwardly tapered female portion, said second graphite tube having a male portion tapered complementary to said taper on said female portion and a bond of fused molybdenum disilicide in said taper between said tubes, whereby a graphite-to-graphite joint leak-proof at high temperatures and corrosion-resistant to liquid metals is produced.

References Cited in the file of this patent

UNITED STATES PATENTS

| | | |
|---|---|---|
| 2,300,503 | Hamister et al. | Nov. 3, 1942 |
| 2,412,081 | Droll | Dec. 3, 1946 |
| 2,498,831 | Veitch | Feb. 28, 1950 |
| 2,512,230 | Greaves et al. | June 20, 1950 |
| 2,570,248 | Kelley | Oct. 9, 1951 |
| 2,619,406 | Briney | Nov. 25, 1952 |
| 2,739,375 | Coxe | Mar. 29, 1956 |

FOREIGN PATENTS

| | | |
|---|---|---|
| 294,267 | Germany | Sept. 25, 1916 |